April 23, 1929.  A. J. CHANTER  1,710,146
BRAKE
Filed May 3, 1928
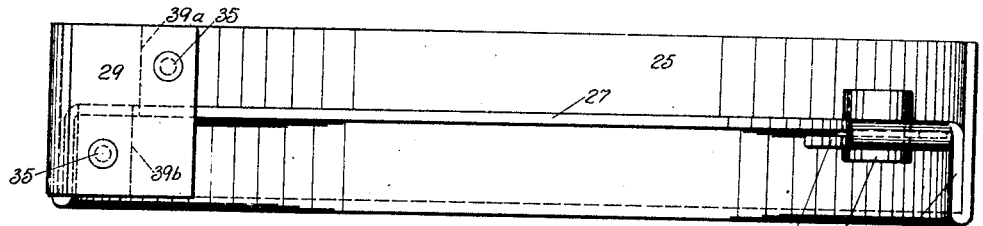
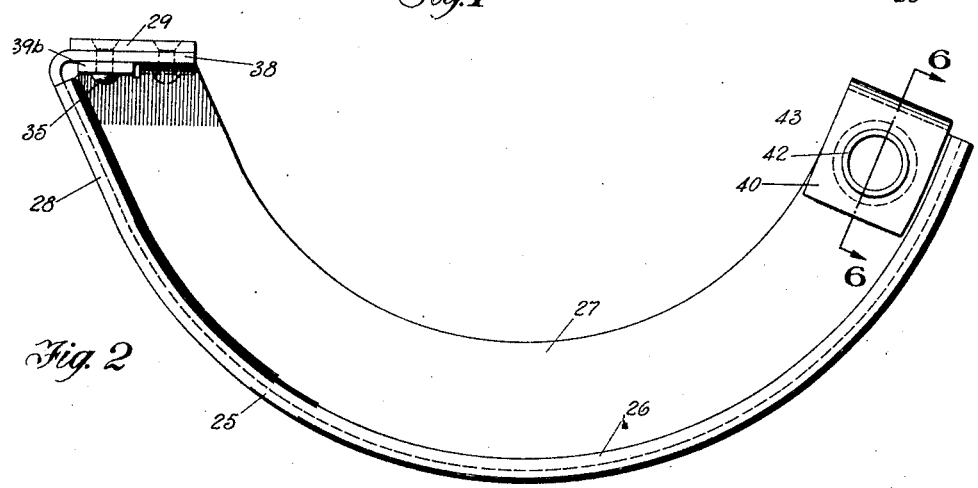
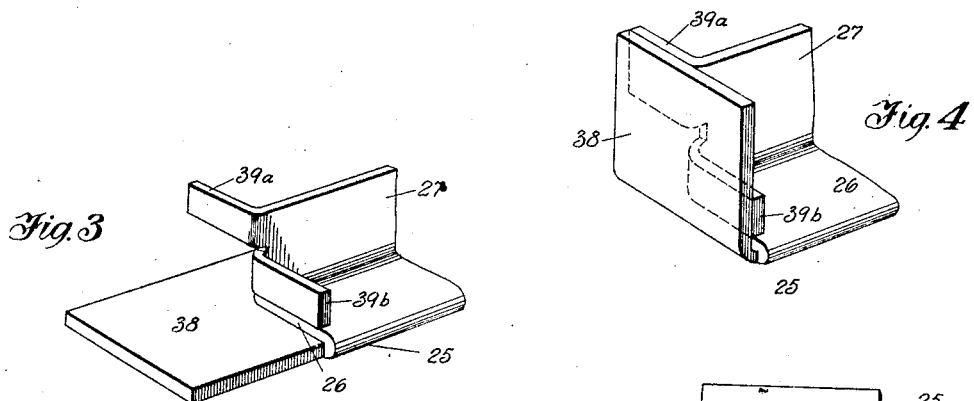
INVENTOR.
Arthur J. Chanter.
BY
P. W. Pomeroy
ATTORNEY Patented Apr. 23, 1929.

1,710,146

UNITED STATES PATENT OFFICE.

ARTHUR J. CHANTER, OF SOUTH BEND, INDIANA, ASSIGNOR TO THE STUDEBAKER CORPORATION, OF SOUTH BEND, INDIANA, A CORPORATION OF NEW JERSEY.

BRAKE.

Original application filed February 27, 1926, Serial No. 91,115. Divided and this application filed May 3, 1928. Serial No. 274,859.

This invention relates to brake shoes for brakes of the internal expanding type and is a division of my copending application, Serial No. 91,115, filed February 27, 1926, the principal object being to provide a vehicle brake with a shoe formed of a single piece of metal whereby it will be light in weight, strong in construction and economical to manufacture, particularly in large quantities.

Another object is to provide a new and novel means for supporting the anchored end of the brake shoe.

Another object is to provide a brake shoe having a cylindrical lining supporting portion, a radial reinforcing rib extended beyond the lining supporting portion bent back in spaced relation to the rib, and a pivot pin bushing supported by the parallel portions of the rib.

A further object is to provide a brake with a pressed metal brake shoe having a cylindrical lining supporting portion and a single radial rib having one end thereof bent back into parallel spaced relation with the body portion of the rib, aligned openings in the rib and bent back portion, and a bushing having a flange thereon supported in the openings with the flange positioned between the rib and bent back portion.

These being among the objects of the present invention the same consists of certain features of construction and combinations of parts to be hereinafter described with reference to the accompanying drawing, and then claimed, having the above and other objects in view.

In the accompanying drawing which illustrates a suitable embodiment of the present invention, Figure 1 is a plan view of a brake shoe embodying certain new features.

Figure 2 is a side elevation of the brake shoe shown in Figure 1.

Figure 3 is a perspective view illustrating the first step in forming the cam contact end of the brake shoe.

Figure 4 is a perspective view of the final form of the cam contact end of the brake shoe.

Figure 5 is a section through the web of the anchored end of the brake shoe showing the first step in forming the same.

Figure 6 is a section similar to Figure 5 showing the anchored end of the shoe completely formed.

Referring to the accompanying drawing in which like numerals refer to like parts throughout the several views, the brake shoe is shown to be of the type adapted to be anchored at one end and engaged by a brake shoe operating cam at the other end. The shoe is provided with an arcuate brake lining attaching portion 25 having the metal at one edge thereof bent back upon itself to form a stiffening portion 26. This portion 26 preferably extends to the center line of the shoe and then extends radially inwardly to provide a stiffening rib 27 perpendicular to the lining attaching portion 25.

The formation of the metal to this shape may be accomplished by either of two methods, depending upon the size of the shoe and the depth of the stiffening rib 27. The first method consists in forming the metal to the cross sectional shape just described and then bending the same to the proper arcuate shape. The second method consists in forming the metal to the proper arcuate shape with the reversely bent portion 26 and lining supporting portion 25 suitably separated so that by successive forming steps the same may be brought together. It is preferable that the portions 26 and 25 be welded together to hold the same against separation. The first method will be found to be most satisfactory where the radial rib 27 is not of very great depth and the second method will be found to be most satisfactory in cases wherein the radial rib 27 is found to be of a depth too great to be easily drawn during the forming to the arcuate shape.

It may be found desirable to bring either one or both ends of the shoe inwardly, as illustrated at 28 in Figure 2, out of the path of the normally arcuate face of the lining attaching portion 25 in order to eliminate any possibility of the rivets (not shown) which secure the ends of the brake lining (not shown) to the face 25 from possible contact with the drum, and to restrain the brake lining from contacting with the brake drum (not shown) at the point where localized pressure may occur with the consequent ill effects.

The cam contact end of the brake shoe is preferably formed as shown in Figures 3 and 4 by first removing a short piece of the radial rib 27 of the shoe and a longer piece of the reversely bent portion 26 leaving an extending portion spaced above the lining supporting portion 25, which is slotted back to a point in line with the edge of the reversely bent portion 26 to provide a pair of tongues 39$^a$ and 39$^b$. The tongue 39$^b$ is then bent outwardly as shown in Figure 3 perpendicular to the plane of the rib 27, and the tongue 39$^a$ is also bent outwardly perpendicular to the plane of the rib 27 but in the opposite direction to the tongue 39$^b$. The extending end 38 of the lining supporting portion 25 is then bent radially of the portion 25 as shown in Figure 4 so that it seats against the oppositely extending tongues 39$^a$ and 39$^b$. This tongue 38 which forms the support for the cam wear plate 29, is then preferably welded to the tongues 39$^a$ and 39$^b$ but if desired it may be secured to the same by the rivets 35 which secure the wear plate 29 thereto. The wear plate 29 is shown secured to the tongue 38 in Figures 1 and 2.

The anchored end of the shoe is preferably formed by extending the rib 27 beyond the edge of the lining supporting portion 25 as shown in Figure 5 to provide a projection 40. The projection 40 and web 27 are formed with spaced openings 41. A bushing 42, having a circumferential flange 43 intermediate its ends is then inserted in the opening 41 in the rib 27 with the flange 43 abutting against the rib 27. The projection 40 is then reversely bent as shown in Figure 6 in spaced relationship to the rib 27 so that the opening 41 therein is in alignment with the opening 41 in the rib 27 and surrounds the cylindrical portion of the bushing 42 on the other side of the flange 43. The flange 43 of the bushing 42 therefore is engaged by the spaced walls of the rib 27 and projection 40 and may be welded thereto if desired to prevent the same from separating.

It is evident from the drawing and foregoing description that a brake shoe is provided which can be easily and economically constructed from a single piece of metal, thus providing a very strong construction.

It is to be understood however, that formal changes may be made in the specific embodiment of the invention described without departing from the spirit and substance of the broad invention, the scope of which is commensurate with the appended claims.

What I claim is:

1. A pressed metal brake shoe having a cylindrical lining attaching surface and a single radial rib extending therefrom and forming an integral part thereof, said rib having an extended end bent into parallelism with said rib and provided with aligned openings in said rib and extended end, and a bushing secured in said openings.

2. A pressed metal brake shoe having a cylindrical lining attaching surface and a single radial rib extending therefrom and forming an integral part thereof, said rib having an extended end bent into parallelism with said rib and aligned openings in said rib and extended end, and a bushing having a flange thereon secured in said openings, said flange extending between said rib and end to space the same.

3. A pressed metal brake shoe having a cylindrical lining attaching surface and a radial rib forming an integral part thereof, said rib having a plurality of openings therein and bent to align said openings, and a bushing secured in said openings.

4. A pressed metal brake shoe having a cylindrical lining attaching surface and a radial rib forming an integral part thereof, said rib having a plurality of openings therein and bent to align said openings, and a bushing having a flange thereon secured in said openings, said flange extending between a face of said rib and the bent end thereof.

5. A pressed metal brake shoe having an arcuate lining attaching surface and a radial rib, said rib having an extended end bent back into spaced relation therewith, and aligned openings in said rib and extended end.

6. A pressed metal brake shoe having an arcuate lining attaching surface and a radial rib, said rib having an extended end bent back into parallel spaced relation therewith, and aligned openings in said rib and extended end.

7. A pressed metal brake shoe having a cylindrical lining attaching surface and a single rib perpendicular thereto, a bushing supported in an opening in said rib adjacent one end thereof, and means attached to said rib adjacent said end forming a second support for said bushing.

8. A brake shoe formed from a single sheet of metal to provide a cylindrical lining attaching portion, a single reversely bent stiffening portion, and an inwardly extending radial rib, one end of said rib being secured to said lining attaching portion, and the opposite end thereof being reversely bent into spaced relation with said rib, and aligned openings in said rib and extended end to provide a supporting means for an anchor pivot for said shoe.

9. A brake shoe formed from a single sheet of metal to provide a cylindrical brake lining attaching portion, a reversely bent stiffening portion, and a single inwardly extending radial rib, one end of said rib being secured to said lining attaching portion, and the opposite end thereof being reversely bent into spaced relation with said rib, aligned openings in said rib, and a bushing supported in said openings to provide a pivot for said shoe.

10. A pressed metal brake shoe having a cylindrical lining attaching portion and a single rib perpendicular thereto, one end of said rib being secured to said lining attaching portion, and the opposite end thereof being bent back into parallel spaced relation with said rib, and aligned openings in said rib and bent back portion to provide means for supporting an anchor for said shoe.

11. A pressed metal brake shoe having a cylindrical lining attaching portion and a single rib perpendicular thereto, one end of said rib being bent back and secured to said lining attaching portion, and the opposite end thereof being bent back into parallel spaced relation with said rib, aligned openings in said rib and bent back portion, and a bushing having a flange thereon secured in said openings with the flange thereof positioned between said rib and the bent back portion thereof.

Signed by me at South Bend this 30th day of April, 1928.

ARTHUR J. CHANTER.